United States Patent
Peltoluhta

(10) Patent No.: US 12,113,921 B2
(45) Date of Patent: Oct. 8, 2024

(54) SUPPORT STRUCTURE FOR A SLIDABLE DISPLAY

(71) Applicant: Huawei Technologies Co., Ltd., Shenzhen (CN)

(72) Inventor: Eetu Peltoluhta, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 17/794,822

(22) PCT Filed: Jan. 24, 2020

(86) PCT No.: PCT/EP2020/051713
§ 371 (c)(1),
(2) Date: Jul. 22, 2022

(87) PCT Pub. No.: WO2021/148130
PCT Pub. Date: Jul. 29, 2021

(65) Prior Publication Data
US 2023/0141376 A1   May 11, 2023

(51) Int. Cl.
*H04M 1/02* (2006.01)
*G06F 1/16* (2006.01)

(52) U.S. Cl.
CPC ........ *H04M 1/0268* (2013.01); *G06F 1/1624* (2013.01); *G06F 1/1652* (2013.01); *H04M 1/0237* (2013.01)

(58) Field of Classification Search
CPC .. G06F 1/1652; G06F 1/1624; H04M 1/0268; H04M 1/0237
See application file for complete search history.

(56) References Cited

U.S. PATENT DOCUMENTS

| | | | |
|---|---|---|---|
| 7,869,844 B2 | 1/2011 | Lee et al. | |
| 10,025,355 B2 | 7/2018 | Bohn et al. | |
| 11,815,948 B2* | 11/2023 | Song | G06F 1/1686 |
| 2007/0155451 A1 | 7/2007 | Lee | |
| 2013/0058063 A1* | 3/2013 | O'Brien | G06F 1/1624 361/807 |
| 2016/0320804 A1* | 11/2016 | Takayanagi | H04M 1/0268 |
| 2016/0324021 A1 | 11/2016 | Takayanagi et al. | |
| 2017/0013726 A1 | 1/2017 | Han et al. | |

(Continued)

FOREIGN PATENT DOCUMENTS

| | | |
|---|---|---|
| CN | 100521562 C | 7/2009 |
| CN | 102902308 A | 1/2013 |

(Continued)

*Primary Examiner* — Nidhi Thaker
(74) *Attorney, Agent, or Firm* — Conley Rose, P.C.

(57) ABSTRACT

A support structure for a slidable display comprises a support arrangement configured to slide along a first sliding axis and at least two rotation arrangements. Each rotation arrangement is fixedly arranged along the first sliding axis and configured to rotate around a rotation axis extending substantially perpendicular to the first sliding axis. Furthermore, each rotation arrangement is releasably interconnected to at least one support element of the support arrangement such that each of the at least two rotation arrangements rotates around the rotation axis with a tangential speed equal to a speed with which the support arrangement moves along the first sliding axis.

17 Claims, 3 Drawing Sheets

(56) References Cited

U.S. PATENT DOCUMENTS

| | | | | |
|---|---|---|---|---|
| 2020/0264660 A1* | 8/2020 | Song | ..................... | G06F 1/1624 |
| 2020/0267246 A1* | 8/2020 | Song | ..................... | H05K 1/148 |
| 2020/0363841 A1* | 11/2020 | Kim | ..................... | G06F 1/1675 |
| 2021/0195008 A1* | 6/2021 | Lee | ..................... | G06F 1/1652 |
| 2021/0383727 A1* | 12/2021 | Han | ..................... | G06F 1/1656 |

FOREIGN PATENT DOCUMENTS

| | | |
|---|---|---|
| CN | 205485747 U | 8/2016 |
| CN | 106097896 A | 11/2016 |
| CN | 106340254 A | 1/2017 |
| CN | 106884867 A | 6/2017 |
| CN | 110428732 A | 11/2019 |
| CN | 110491289 A | 11/2019 |
| EP | 0939041 A1 | 9/1999 |
| EP | 3282343 A1 | 2/2018 |
| KR | 20080079574 A | 9/2008 |
| KR | 20140045024 A | 4/2014 |
| KR | 20140059274 A | 5/2014 |
| KR | 20160129669 A | 11/2016 |
| WO | 2019107909 A1 | 6/2019 |

\* cited by examiner

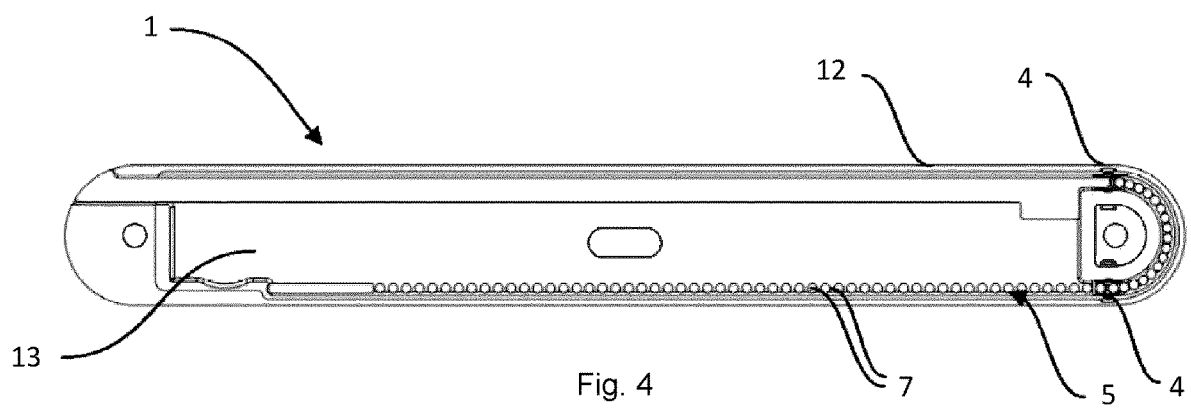
Fig. 4
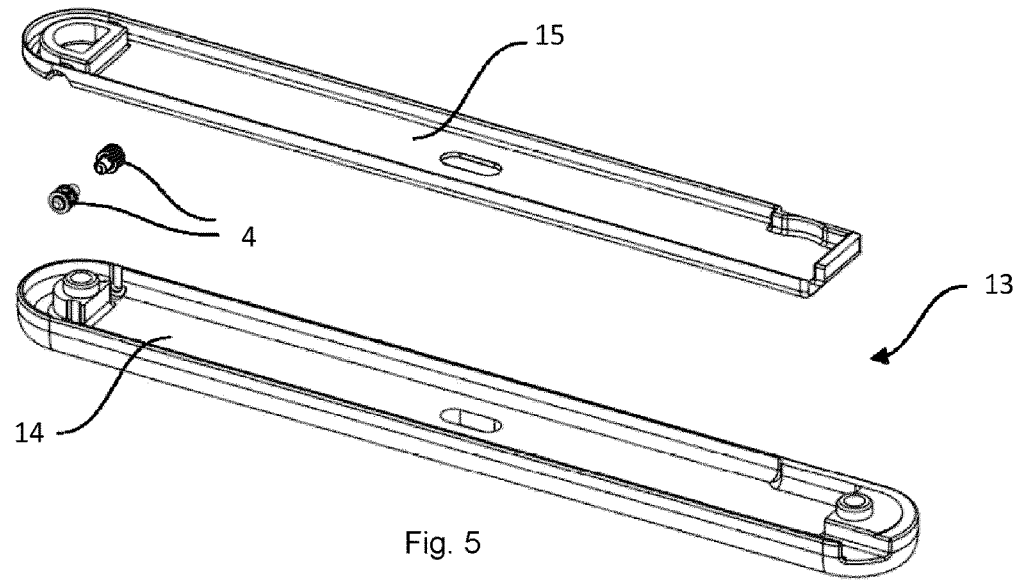
Fig. 5
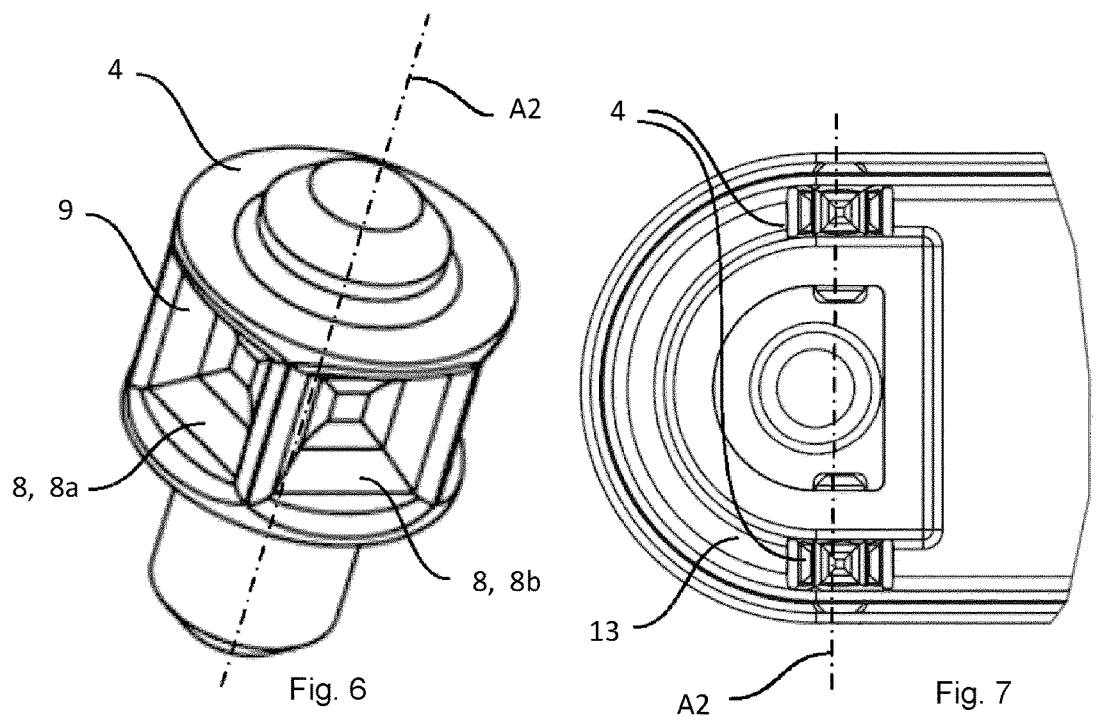
Fig. 6
Fig. 7

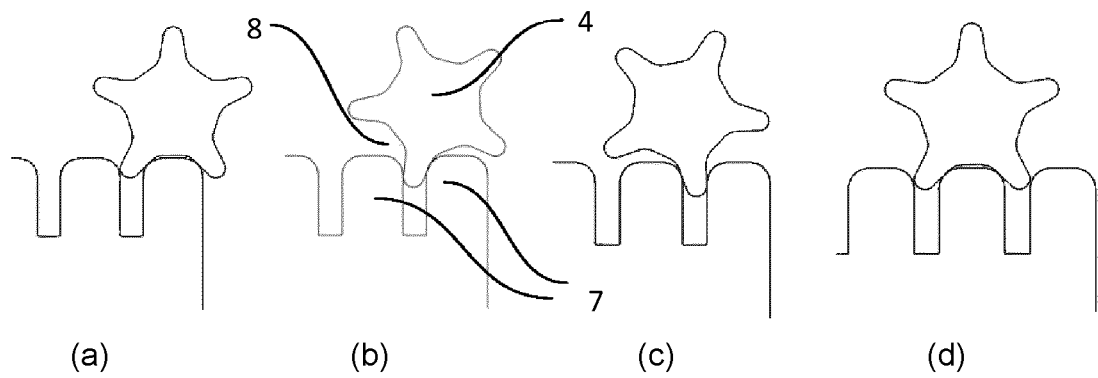
Fig. 8
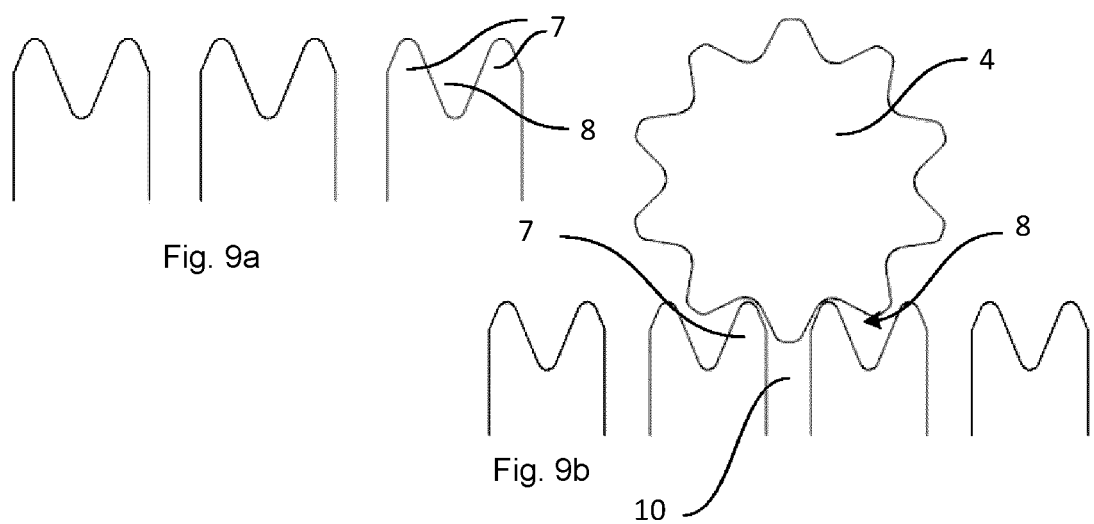
Fig. 9a
Fig. 9b
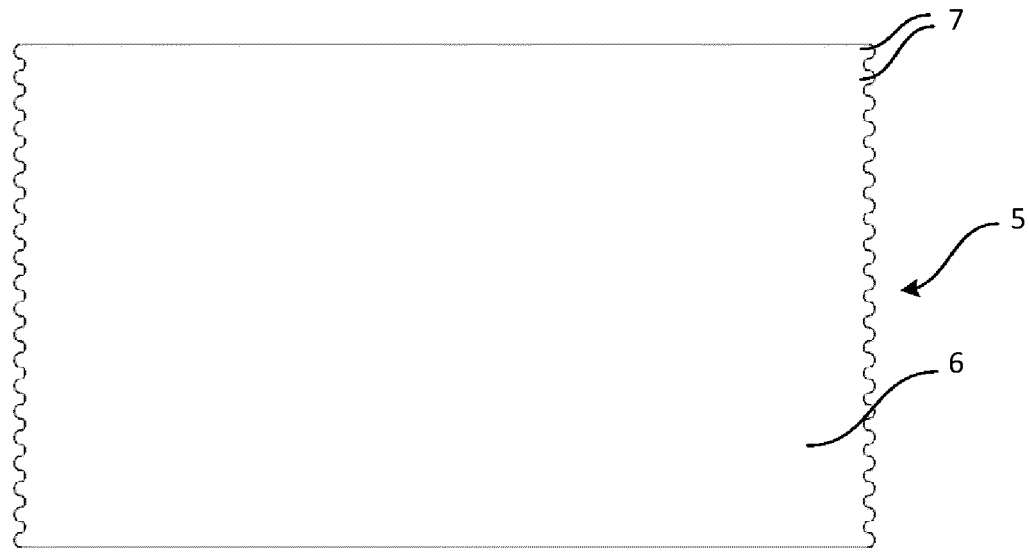
Fig. 10

SUPPORT STRUCTURE FOR A SLIDABLE DISPLAY

CROSS-REFERENCE TO RELATED APPLICATIONS

This is a U.S. National Stage of International Patent Application No. PCT/EP2020/051713 filed on Jan. 24, 2020, which is hereby incorporated by reference in its entirety.

TECHNICAL FIELD

The disclosure relates to a support structure for a slidable display, more particularly to a support structure for a sliding display of an electronic device.

BACKGROUND

With the continuous improvement of electronic devices and smartphones, inherently there is also a need for advanced displays. One trend in the development of screens is extendable displays that provide devices having similar sizes but with larger screens. There are different types of extendable displays, such as bending, folding, rolling, and/or sliding displays.

It is apparent that, in order to be efficient, these displays need to have a support structure supporting the movement of the display, and also allowing the display to be flexible. Also, the display should be able to move, roll or slide as smoothly as possible, thus friction generated by movement has to be reduced. Currently, the most often used solution is to coat the sliding surfaces with a low-friction material, such as POM (Acetal, also known as Polyoxymethylene). However, this only partially reduces friction.

Patent application no. WO2019107909 comprises a belt-like display support. The tight bending radius of the display creates a bump near the bend, which bump effect is mitigated by means of a wire. This is a high-cost system which also adds unwanted weight to the device.

SUMMARY

It is an object to provide an improved support structure. The foregoing and other objects are achieved by the features of the independent claims. Further implementation forms are apparent from the dependent claims, the description, and the figures.

According to a first aspect, there is provided a support structure for a slidable display, the support structure comprising a support arrangement configured to slide along a first sliding axis, at least two rotation arrangements, each rotation arrangement being fixedly arranged along the first sliding axis and configured to rotate around a rotation axis extending substantially perpendicular to the first sliding axis, each rotation arrangement being releasably interconnected to at least one support element of the support arrangement, such that the rotation arrangement rotates around the rotation axis with a tangential speed equal to a speed with which the support arrangement moves along the first sliding axis.

This solution provides a support structure with reduced sliding friction between the slidable display and the housing of the mobile device, since the use of the rotation arrangement almost entirely eliminates sliding friction by converting it into much smaller rotational friction. The rotation arrangement has a simple configuration and structure, and can be produced and replaced at low cost. The maintenance and/or replacement of worn rotation arrangements is easy, since the rotation arrangements are individual elements. In addition, the weight of the support structure, and/or the device into which it is mounted, is reduced.

In a possible implementation form of the first aspect, the support arrangement is configured to fold around a folding axis and slide along a second sliding axis, the second sliding axis extending at an angle to the first sliding axis, the folding axis extending substantially perpendicular to the first sliding axis, the second sliding axis, and the rotation axis, at least two rotation arrangements being fixedly arranged along the second sliding axis, each rotation arrangement being configured to rotate around a rotation axis extending substantially perpendicular to the second sliding axis. This facilitates continuous guiding of the sliding movement and provides smooth sliding with reduced friction.

In a further possible implementation form of the first aspect, a folded section of the support structure, extending between the first sliding axis and the second sliding axis, comprises at least two rotation arrangements. This facilitates guiding of the sliding movement even after the fold of the display. Having rotation arrangements along the whole length of the display helps reduce or completely eliminate the bump of the display.

In a further possible implementation form of the first aspect, the number of rotation arrangements is even, preferably between 2-40.

In a further possible implementation form of the first aspect, the interconnection between the rotation arrangement and the support element is achieved by means of at least partially complementary shapes. This facilitates a constraint in the movement of the display to be only in the direction of the sliding axis, thus reducing the display bump effect.

In a further possible implementation form of the first aspect, a first end of the support arrangement is interconnected to at least one first rotation arrangement, and a second end of the support arrangement is interconnected to at least one second rotation arrangement. This facilitates the same guiding and equal speed on both sides of the support arrangement, which supports even and smooth sliding of the display.

In a further possible implementation form of the first aspect, the support arrangement comprises a plurality of support elements, each support element being a protrusion extending from a sheet.

In a further possible implementation form of the first aspect, the support arrangement comprises a sheet and a plurality of support elements, each support element comprising a rod arranged to support the sheet, center axes of the support elements extending in parallel with each other and with the folding axis.

In a further possible implementation form of the first aspect, the interconnection between the rotation arrangement and the support element prevents translation of the support element in all directions except along the first sliding axis and/or the second sliding axis.

In a further possible implementation form of the first aspect, the rotation arrangement comprises a transmission wheel being in sliding contact with the support element.

In a further possible implementation form of the first aspect, the rotation arrangement comprises a transmission wheel comprising a plurality of slots arranged around a circumference of the transmission wheel, each slot being configured to engage with one end of one support element.

This facilitates a simple connection between the rotation arrangements and the support elements.

In a further possible implementation form of the first aspect, there is at least one contact point between the rotation arrangement and the support element at any time during interconnection, a maximum contact area achieved when the rotation axis and the center axis are aligned.

In a further possible implementation form of the first aspect, the plurality of slots comprises at least a first slot and a neighboring second slot, and the plurality of support elements comprises at least a first support element and a neighboring second support element, the first slot engaging the first support element, and wherein, as the support arrangement slides along the first sliding axis and the rotation arrangement rotates around the rotation axis, the first slot disengages from the first support element and the second slot engages the second support element.

In a further possible implementation form of the first aspect, the neighboring slots are delimited by a joint shoulder, the shoulder extending into a gap between two neighboring support elements, as the support arrangement slides along the first sliding axis and the rotation arrangement rotates around the rotation axis.

In a further possible implementation form of the first aspect, the support structure further comprises a motor operatively connected to the rotation arrangement, the motor being configured to drive the sliding movement of the support arrangement via the rotation arrangement. In this way, the support structure also works as actual drive means for moving the display.

According to a second aspect, there is provided a slidable display arrangement for an electronic device, the slidable display arrangement comprising a slidable display and a support structure, the support structure supporting the slidable display, and being configured to slide the slidable display along the first sliding axis of the support structure, and/or fold the slidable display around the folding axis of the support structure, simultaneously with the support arrangement of the support structure. This solution facilitates a display arrangement with reduced sliding friction, where the bump of the display near the fold is avoided.

According to a third aspect, there is provided an electronic device comprising a housing, two end cap modules arranged at opposite sides of the housing, and the slidable display arrangement. The end caps help guide the slidable display and help the slidable display stay in the direction of the sliding axis.

In a possible implementation form of the third aspect, the end cap module comprises an outer end cap and an inner end cap, the rotation arrangement of the support structure of the slidable display arrangement being at least partially enclosed between the outer end cap and the inner end cap, such that the support arrangement of the support structure is interconnected with the end cap modules via the rotation arrangement. This facilitates simple placement of the rotation arrangements. The placement of the rotation arrangements between the outer end cap and the inner end cap (such that a part of rotation arrangements may protrude) makes simple maintenance and/or replacement of the rotation arrangements possible. Furthermore, there is no need for other fixtures for placing the rotation arrangements. The low number of additional elements in the device also reduces the risk of malfunction and mechanical failures.

In a further possible implementation form of the third aspect, the slidable display arrangement may be in one of a retracted position and an extended position in relation to the housing and the end cap modules.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 4 shows a cross-sectional view of a support structure mounted in an electronic device in accordance with one embodiment of the present invention;

FIG. 5 shows an exploded view of an end cap module in accordance with one embodiment of the present invention;

FIG. 6 shows an isometric view of a rotation arrangement in accordance with one embodiment of the present invention;

FIG. 7 shows a partial side view of a folded electronic device in accordance with one embodiment of the present invention;

FIG. 8a to FIG. 8d show schematic views of a rotation arrangement engaging with support elements in accordance with one embodiment of the present invention;

FIG. 9a shows a schematic view of support elements in accordance with one embodiment of the present invention;

FIG. 9b shows the embodiment of FIG. 9a, wherein a rotation arrangement engages with the support elements;

FIG. 10 shows a top view of a support arrangement in accordance with one embodiment of the present invention.

DETAILED DESCRIPTION

Figure 1:
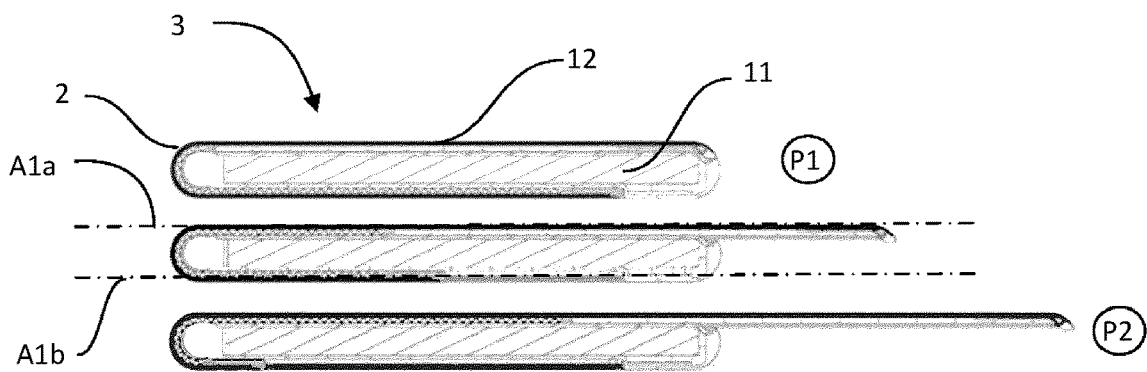
FIG. 1 shows schematic cross-sectional views of an electronic device having a slidable display in accordance with one embodiment of the present invention, the display being in a retracted position, an intermediate position, and a fully extended position.

FIG. 1 illustrates a slidable display arrangement 2 for an electronic device 3, which comprises a slidable display 12 and a support structure 1 for a slidable display 12. The electronic device 3 may be for example a mobile phone or a tablet. The slidable display 12 is able to extend the screen size of the electronic device 3. The enlarged slidable display 12 can be used when the display arrangement 2 is in extended position P2 shown in FIG. 1, which extended position 2 is achieved by a sliding movement of the slidable display 12. The slidable display 12 and its support structure 1 is flexible and able to fold so that it can be stored in the electronic device 3 while the display arrangement 2 is in retracted position P1. The support structure 1, which will be described in further detail below, assists the slidable display 12 in this sliding movement so that it supports and slides the slidable display 12 along the first sliding axis A1a. Instead of or in addition to sliding it may also assist in folding the slidable display 12 around the folding axis A3. In one embodiment, the slidable display arrangement 2 moves simultaneously with the support arrangement 5, which is a part of the support structure 1. The support structure 1 also comprises at least two rotation arrangements 4 which help reduce the friction of the movement and thus the sliding movement go smoothly. The rotation arrangement 4 will also be described in more detail below.

The electronic device 3 of the embodiment shown in FIG. 1 and FIG. 4 comprises a housing 11 and two end cap modules 13 arranged at opposite sides of the housing 11. The end cap modules 13 may be part of the housing 11, or may be separate elements. The end cap modules 13 may be positioned within the housing 11 or outside the housing 11. The electronic device 3 may also comprise the slidable display arrangement 2 according to the embodiment described above.

The above-described end cap modules 13 of the electronic device 3 are illustrated in FIG. 5. The end cap modules 13 may comprise an outer end cap 14 and an inner end cap 15. In one embodiment, the outer end cap 14 may be of metal, while the inner end cap 15 may be of plastic. The rotation arrangement 4 is at least partially enclosed between the outer end cap 14 and the inner end cap 15, as FIG. 7 shows. In this embodiment the support arrangement 5 is interconnected with the end cap modules 13 only via the rotation arrangement 4. This helps reducing the friction further, as the connection between elements of the support structure 1 and the electronic device 3 or the housing 11 of the electronic device 3 is minimal.

As shown in FIG. 1, and already mentioned above, the slidable display arrangement 2 in the electronic device 3 may be in a retracted position P1 or in an extended position P2 in relation to the housing 11 and the end cap modules 13. The slidable display 12 and the electronic device 3 are able to function in both positions.

Figure 2:
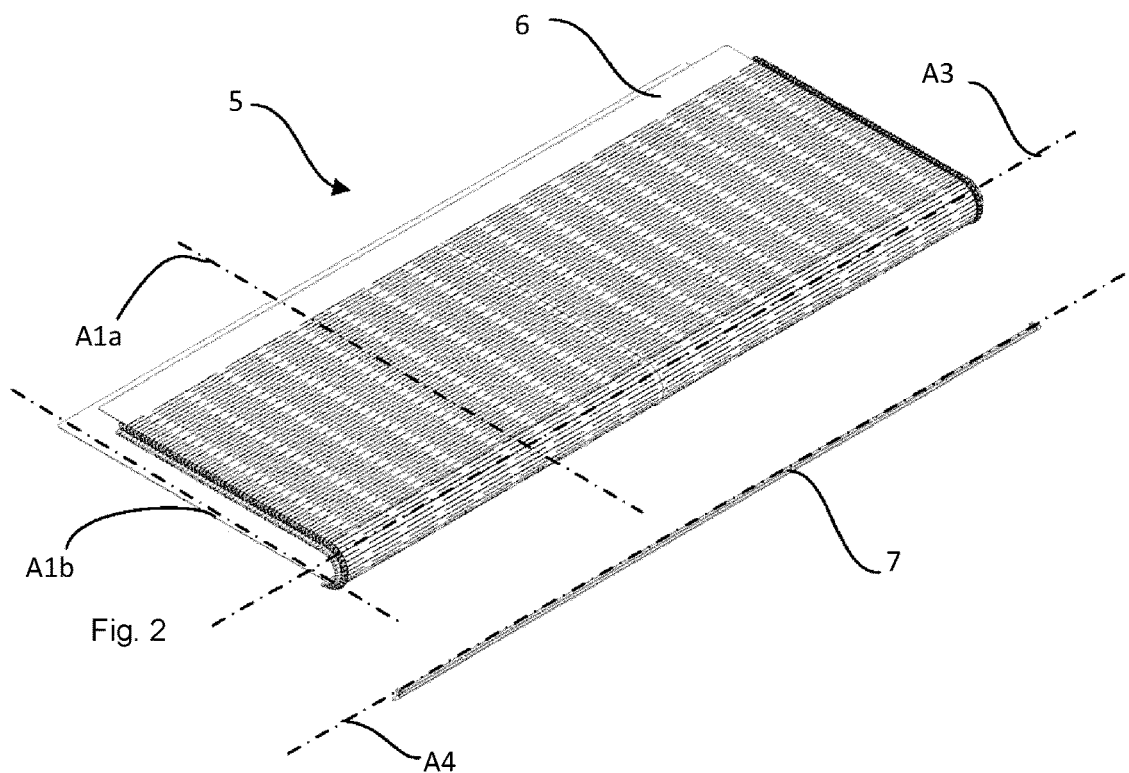
FIG. 2 shows an isometric view of a support arrangement in accordance with one embodiment of the present invention.
Figure 3:
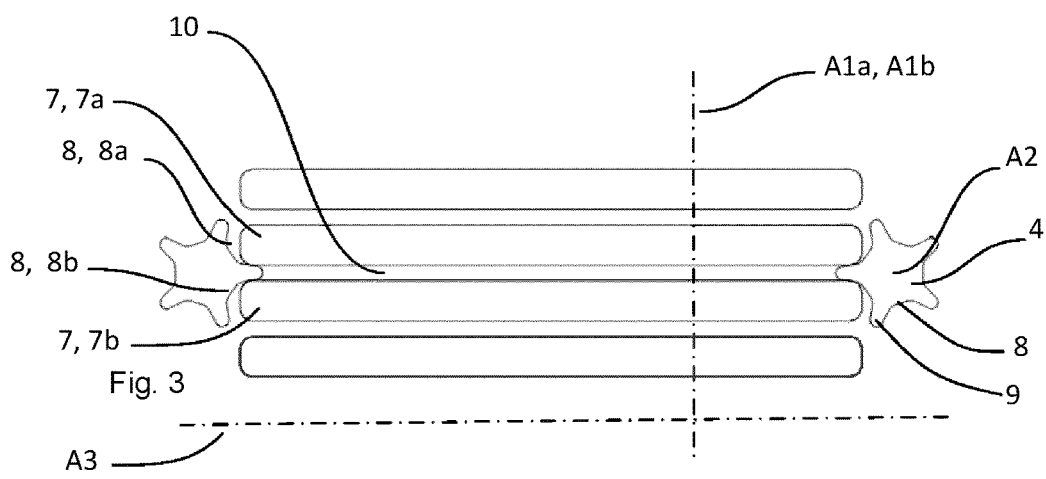
FIG. 3 shows a schematic top view of a support structure in accordance with one embodiment of the present invention.

The support structure 1 shown in FIGS. 3 and 4 comprises a support arrangement 5 and at least two rotation arrangements 4. The support arrangement 5 contains at least one support element 7 and/or a sheet 6, and is configured to slide along a first sliding axis A1a. As already mentioned, the support arrangement 5 may move simultaneously with the slidable display arrangement 2. Different embodiments of the support arrangement 5 are illustrated for example in FIGS. 2 and 10. Embodiments of the rotation arrangement 4 are shown in FIG. 3 and also in FIGS. 6-9.

Each rotation arrangement 4 is fixedly arranged along the first sliding axis A1a. The placement, in one embodiment, is assisted by the outer end cap 14 and the inner end cap 15, such that no more fixtures are necessary. During the sliding movement, the rotation arrangements 4 rotate around their rotation axes A2. The rotation axes A2 extend substantially perpendicular to the first sliding axis A1a, as is shown in FIG. 3. Each rotation arrangement 4 is releasably interconnected to at least one support element 7 of the support arrangement 5. The rotation arrangement 4 rotates around the rotation axis A2 with a tangential speed equal to the speed with which the support arrangement 5 moves along the first sliding axis A1a.

As shown in FIG. 2, the support arrangement 5 may be configured to fold around a folding axis A3 and slide along a second sliding axis A1b. This movement occurs for example when the electronic device changes its position from a retracted position P1 to an extended position P2 or vice versa. The second sliding axis A1b extends at an angle to the first sliding axis A1a, but in some embodiments first sliding axis A1a and second sliding axis A1b are parallel, as shown in FIG. 1. The folding axis A3 extends substantially perpendicular to the first sliding axis A1a, the second sliding axis A1b, and the rotation axis A2. There are at least two rotation arrangements 4 arranged also along the second sliding axis A1b, the same way as along the first sliding axis A1a. The direction and axis of rotation of the rotation arrangements 4 arranged along the second sliding axis A1b is the same as of the rotation arrangements 4 arranged along the first sliding axis A1a. Thus, the second sliding axis A1b is also substantially perpendicular to the rotation axis A2.

In the folded section of the support structure 1, illustrated in FIG. 7, there are also at least two rotation arrangements 4 positioned. The frequent provision of rotation arrangements 4 provides better support for the slidable display arrangement 2 and the slidable display 12. The folded section extends between the first sliding axis A1a and the second sliding axis A1b. The sliding axes A1a and A1b can be seen in FIGS. 1 to 3.

The number of rotation arrangements 4 in the support structure 1 is, according to one embodiment, an even number, preferably between 2-40. This number depends on the size of the electronic device in which the structure is to be mounted, and on the size, thickness and type of the display. Furthermore, the number of rotation arrangements 4 can vary based on the size of the rotation arrangement 4 as well.

The rotation arrangement 4 may comprise, or may be, a transmission wheel, a sprocket, a gear, or a pulley wheel, and may be in sliding contact with the support element 7.

The interconnection between the rotation arrangement 4 and the support element 7 can be achieved by different methods and differently shaped features. Some embodiments are illustrated in FIGS. 8 and 9, achieved by means of at least partially complementary shapes.

The support arrangement 5 may also have different parts and/or shape, but preferably two ends of the support arrangement 5 are in contact with at least two rotation arrangements 4, one on each side. In one embodiment, the support arrangement 5 comprises a plurality of support elements 7, each end of each support element 7 comprising a protrusion extending from a sheet 6, the sheet 6 supporting the slidable display 12 and each protrusion interacting with one rotation arrangement 4. An illustration of this embodiment is FIG. 10.

The support arrangement 5 according to the embodiment shown in FIG. 2 comprises a sheet 6 and a plurality of support elements 7. In one embodiment, each support element 7 comprises a rod arranged to support the sheet 6. The number of rods depends on the size of the slidable display arrangement 2 and/or the slidable display 12. The center axes A4 of the support elements 7 are parallel with each other and with the folding axis A3, and are perpendicular to the direction of the sliding movement.

The interconnection between the rotation arrangement 4 and the support element 7 prevents translation of the support element 7 in all directions except along the first sliding axis A1a and/or the second sliding axis A1b.

The rotation arrangement 4 can have many different forms depending on the interconnection to the support arrangement 5. One possible shape is illustrated in FIG. 6. In this embodiment, the rotation arrangement 4 comprises a centrally symmetric transmission wheel. In the embodiment illustrated in FIG. 6, the rotation arrangement 4 is also equipped with a pin.

The pin may be in sliding contact with the housing 11, as indicated in FIG. 7, or it may comprise a separate bearing arranged around the pin, at its top and/or bottom, the bearing being mounted in the end cap module 13. Furthermore, the rotation arrangement 4 may be provided with an inner bearing, in which case the pin is stationary. Each rotation arrangement 4 may, in other words, be a single piece of low-friction material, or an assembly comprising also a separate pin, a wheel, and possibly one or several bearings.

A rotation arrangement 4 having this shape also comprises a plurality of slots 8. These slots 8 are arranged around a circumference of the transmission wheel, and each slot 8 is able to engage with one end of one support element 7. The number of slots 8 in each wheel is preferably 3-10, more preferably 5. The number of slots 8 in the wheels depend on the spacing of support elements 7, and the diameter of the wheel. The slot 8 and the end of the support element 7 may both comprise a square frustum.

During interconnection, as illustrated in FIG. 8a to 8d, there is at least one contact point between the rotation arrangement 4 and the support element 7 at any time. The maximum contact area, which is shown in FIGS. 8a and 8d, is achieved when the rotation axis A2 and the center axis A4 are aligned.

In an embodiment as shown in FIGS. 3, 6 and 8, the plurality of slots 8 comprises at least a first slot 8a and a neighboring second slot 8b. Furthermore, the plurality of support elements 7 comprises at least a first support element 7a and a neighboring second support element 7b. As shown in FIGS. 3 and 8, when the first slot 8a engages the first support element 7a, the support arrangement 5 slides along the first sliding axis A1a and the rotation arrangement 4 rotates around the rotation axis A2. After this, the first slot 8a disengages from the first support element 7a and the second slot 8b engages the second support element 7b.

FIG. 6 depicts that the neighboring slots 8 may be delimited by a joint shoulder 9. In this embodiment, the shoulder 9 extends into a gap 10 between two neighboring support elements 7a, 7b as the support arrangement 5 slides along the first sliding axis A1a and the rotation arrangement 4 rotates around the rotation axis A2.

The sliding movement can be achieved by different solutions, for example by driving the slidable display arrangement 2 and/or the support arrangement 5. This way, the rotation of the rotation arrangements 4 is also started by the slidable display arrangement 2 and/or the support arrangement 5. However, the support structure 1 may comprise a motor. In this case, the motor would be connected to the rotation arrangement 4, thus driving the rotation arrangement 4. Therefore, the sliding movement can be achieved by driving the sliding movement of the support arrangement 5 via the rotation arrangement 4 as well.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A support structure for a slidable display comprising: a support arrangement configured to slide along a first sliding axis and comprising at least one support element; and at least two rotation arrangements, wherein each of the at least two rotation arrangements is partially enclosed between an outer end cap and an inner end cap of one of two end caps arranged at opposite sides of a housing, wherein the at least two rotation arrangements are arranged to enable the support arrangement to interconnect with the two ends caps via the at least two rotation arrangements, wherein each of the at least two rotation arrangements is fixedly arranged along the first sliding axis and configured to rotate around a rotation axis extending substantially perpendicular to the first sliding axis, wherein each of the at least two rotation arrangements is further releasably interconnected to the at least one support element to enable each of the at least two rotation arrangements to rotate around the rotation axis with a tangential speed equal to a speed with which the support arrangement moves along the first sliding axis, and wherein the support arrangement is further configured to: slide along a second sliding axis extending at an angle to the first sliding axis, wherein the rotation axis further extends substantially perpendicular to the second sliding axis; and fold around a folding axis extending substantially perpendicular to the first sliding axis, the second sliding axis, and the rotation axis, wherein the at least two rotation arrangements are further fixedly arranged along the second sliding axis.

2. The support structure of claim 1, further comprising a folded section extending between the first sliding axis and the second sliding axis and comprising the at least two rotation arrangements.

3. The support structure of claim 1, wherein a quantity of the at least two rotation arrangements is even and is between 2-40.

4. The support structure of claim 1, wherein each of the at least two rotation arrangements and the at least one support element are further releasably interconnected using partially complementary shapes.

5. The support structure of claim 1, wherein the support arrangement further comprises:
   a first end interconnected to at least one first rotation arrangement of the at least two rotation arrangements, and
   a second end interconnected to at least one second rotation arrangement of the at least two rotation arrangements.

6. The support structure of claim 1, further comprising a sheet, wherein the support arrangement further comprises a plurality of support elements, and wherein each of the plurality of support elements comprises a protrusion extending from the sheet.

7. The support structure of claim 1, wherein the support arrangement further comprises: a sheet; and a plurality of support elements, wherein each of the support elements comprises a rod arranged to support the sheet, and wherein center axes of the support elements extend in parallel with each other and with the folding axis.

8. The support structure of claim 1, wherein each of the at least two rotation arrangements and the at least one support element are configured to form a releasable interconnection that prevents translation of the at least one support element in all directions except along the first sliding axis and the second sliding axis.

9. The support structure of claim 1, wherein each of the at least two rotation arrangements comprises a transmission wheel that is in sliding contact with the at least one support element.

10. The support structure of claim 1, wherein each of the at least two rotation arrangements comprises a transmission wheel comprising a plurality of slots arranged around a circumference of the transmission wheel, and wherein each of the slots is configured to engage with one end of the at least one support element.

11. The support structure of claim 10, further comprising at least one contact point between each of the at least two rotation arrangements and the at least one support element at any moment during an interconnection, wherein the at least one contact point achieves a maximum contact area when the rotation axis and a center axis of the at least one support element are aligned.

12. The support structure of claim 10, wherein the slots comprise a first slot and a neighboring second slot, wherein the at least one support element comprises a first support element and a neighboring second support element, and wherein the first slot is configured to:
engage with the first support element; and
disengage from the first support element as the support arrangement slides along the first sliding axis and the at least two rotation arrangements rotate around the rotation axis, and
wherein the neighboring second slot is configured to engage with the neighboring second support element as the support arrangement slides along the first sliding axis and the at least two rotation arrangements rotate around the rotation axis.

13. The support structure of claim 10, further comprising a joint shoulder, wherein neighboring slots of the slots are configured to be delimited by the joint shoulder extending into a gap between two neighboring support elements of the at least one support element as the support arrangement slides along the first sliding axis and the at least two rotation arrangements rotate around the rotation axis.

14. The support structure of claim 1, further comprising a motor operatively coupled to the at least two rotation arrangements and configured to drive a sliding movement of the support arrangement via the at least two rotation arrangements.

15. The support structure of claim 1, wherein each of the at least two rotation arrangements and the at least one support element are configured to form a releasable interconnection that prevents translation of the at least one support element in all directions except along the first sliding axis or the second sliding axis.

16. An electronic device comprising: a housing comprising opposite sides; two end caps arranged at the opposite sides, wherein each of the two end caps comprises an outer end cap and an inner end cap; and a slidable display arrangement comprising: a slidable display; and a support structure comprising: a support arrangement; and at least two rotation arrangements, wherein each of the at least two rotation arrangements is partially enclosed between the outer end cap and the inner end cap of one of the two end caps to enable the support arrangement to interconnect with the two end caps via the at least two rotation arrangements, wherein the support structure supports the slidable display and is configured to: slide the slidable display along a first sliding axis of the support structure; or simultaneously fold the slidable display and the support arrangement around a folding axis of the support structure, wherein the folding axis extends substantially perpendicular to the first sliding axis, a second sliding axis, and a rotation axis, wherein the second sliding axis extends at an angle to the first sliding axis, wherein the rotation axis further extends substantially perpendicular to the second sliding axis; and slide along the second sliding axis, wherein the at least two rotation arrangements are further fixedly arranged along the second sliding axis.

17. The electronic device of claim 16, wherein the slidable display arrangement is in one of a retracted position in relation to the housing and the two end caps or an extended position in relation to the housing and the two end caps.

\* \* \* \* \*